April 10, 1934.    R. S. SANFORD    1,954,538
BRAKE
Original Filed Jan. 18, 1928
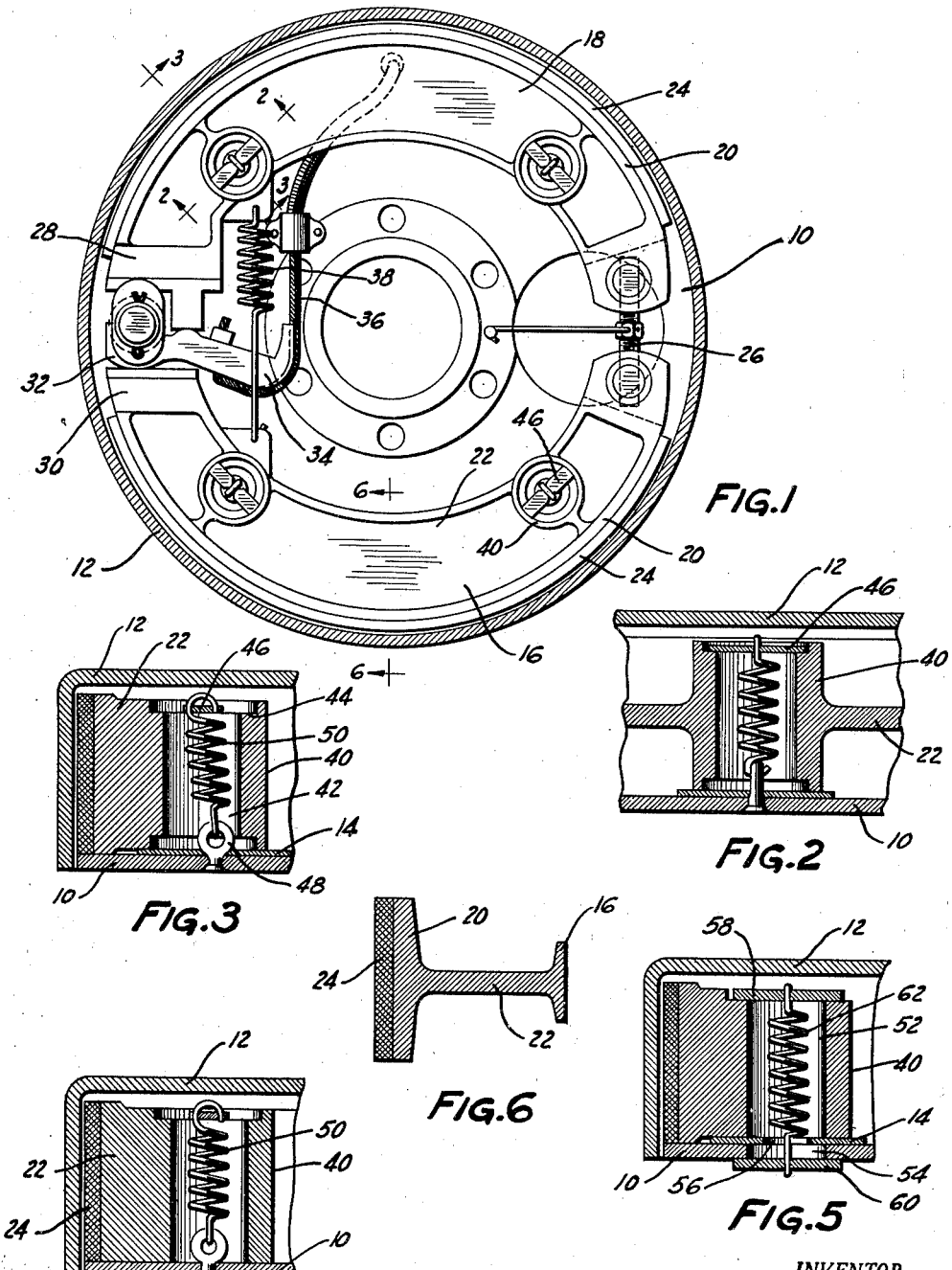
INVENTOR.
ROY S. SANFORD
BY  M. W. McConkey
ATTORNEY Patented Apr. 10, 1934

1,954,538

UNITED STATES PATENT OFFICE 1,954,538

BRAKE

Roy S. Sanford, South Bend, Ind., assignor to Bendix Brake Company, South Bend, Ind., a corporation of Illinois Original application January 18, 1928, Serial No. 247,505. Divided and this application December 3, 1930, Serial No. 499,682

14 Claims. (Cl. 188—78)

This invention relates to brakes and more particularly to internal expanding brakes.

The present invention is a division of my pending application Serial No. 247,505, filed January 18, 1928.

Heretofore, various means have been devised for retaining the friction elements of a brake against lateral movement. Such devices are known in the art as steady rests. Generally, these devices include studs positioned on the backing plate of the brake and adaptable for engagement with openings in the friction elements with sufficient play to provide for circumferential and radial movement of the friction elements. Such structures are not found entirely satisfactory because they do not retain the friction elements in the position to which they have been shifted by the wiping action of the drum with minimum clearance between the friction elements and the drum.

The present invention aims to overcome this objection by providing suitable steady rests arranged to support the friction elements on a fixed support or backing plate with slight resistance to radial and centrifugal movement and to retain the friction elements in any position to which they may be shifted by the wiping action of the drum, so that minimum clearance may be had under all conditions.

An object of the invention is to provide a steady rest for a friction element adapted to retain the friction element against lateral movement and in close frictional engagement with a fixed support.

Another object of the invention is to provide a steady rest for a friction element affording smooth radial and circumferential movement of the element.

A further object of the invention is to provide yieldable steady rests for friction elements affording slight frictional resistance to limit radial and circumferential movements of the elements and arranged to support the elements when released in any position to which they may be shifted by the wiping action of the drum.

Yet a further object of the invention is to provide steady rests for the friction elements of an internal expanding brake arranged to retain the elements in engagement with a friction ring or wear plate positioned on a fixed support or backing plate of the brake.

Other objects of the invention will appear from the following description taken in connection with the drawing, which forms a part of this specification, and in which:

Figure 1 is a vertical sectional view of a brake taken just back of the head of the drum illustrating the invention as applied;

Figure 2 is a sectional view substantially on line 2—2, Figure 1;

Figure 3 is a sectional view substantially on line 3—3, Figure 1;

Figure 4 illustrates a modified form of the steady rest;

Figure 5 illustrates a further modified form of the steady rest; and

Figure 6 is a section substantially on line 6—6, Figure 1.

Referring to the drawing for more specific details of the invention, 10 represents a fixed support such as a backing plate having associated therewith a rotatable drum 12 adapted to be secured to a wheel, not shown. Positioned on the backing plate is a frictional wear plate 14 and positioned for movement on the plate 14 is a primary shoe 16 and a secondary shoe 18. Each of these shoes has a rim 20 supported by a web 22 and suitably secured to the rims are liners 24 adaptable for engagement with the braking surface of the drum.

As shown, the articulated ends of the shoes are connected by an adjusting member 26 and the separable ends are provided with shoulders 28 and 30. An operating cam 32 is positioned between the shoulders 28 and 30 and a suitable lever 34 for the cam is connected to a control cable 36 extending through the backing plate 10 to a suitable source of power, not shown. The shoes are connected by a return spring 38 which retains the separable ends of the shoes in close engagement with the operating cam 32.

The shoes 16 and 18 have positioned on their webs in spaced relation with respect to each other and arranged adjacent the respective ends of the shoes bosses 40. These bosses are bored as indicated at 42 transversely with respect to the webs. As shown, the bosses are counterbored to provide a shoulder 44 and a cross member 46 is fitted snugly in the larger bore substantially in the circumferential line of movement of the shoes.

Arranged on the backing plate in spaced relation to each other and substantially centrally with respect to the bores 42 are eye bolts or rivets 48. As shown, the shanks of these rivets extend through the wear plate 14 and the backing plate 10 and serve to secure these members together. The eye bolts 48 are connected by suitable coil springs 50 to the cross members 46.

A modified form of the invention is illustrated in Figure 4 wherein the wear plate 14 is eliminated, so that the shoe may be retained in frictional engagement with the backing plate 10, and Figure 5 illustrates a further modification wherein the webs of the shoes are provided with transverse bores 52 adapted to register with openings 54 in the backing plate. In this embodiment, the wear plate is provided with openings 56 concentric with the openings 54 in the backing plate. A disk 58 is positioned over the bores 52 in the webs of the shoes and a disk 60 is positioned over the bores 54 in the backing plate, and these disks are connected by a coil spring 62. The springs serve to retain the shoes in any position to which they may be shifted.

In both the preferred and modified forms of the invention, the shoes are retained on the fixed support or backing plate or on the wear plate, as the case may be, by the springs 50 or 62 and in either instance, the shoes are free for limited radial and circumferential movement with slight resistance, so that they may be retained in any position to which they may be shifted by the wiping action of the drum with minimum clearance between the shoes and the drum.

It is to be understood that the forms of my invention herein shown and described are to be taken as preferred examples and that various changes in shape, size and arrangement of parts may be resorted to without departing from the spirit of the invention or the scope of the subjoined claims.

Having thus described the various features of the invention, what I claim as new and desire to secure by Letters Patent is:

1. A brake comprising a drum, friction means engaging with the drum and means for holding all parts of the friction means in any position relatively to said drum to which they may be shifted by the wiping action of the drum when the brake is released.

2. A brake comprising a drum, a friction device engaging with the drum and anchoring at one point when the drum is turning in one direction and at a different point when the drum is turning in the other direction and means for holding the friction device in any position to which it may be shifted by the wiping action of the drum when the brake is released.

3. A brake comprising a drum, a friction device anchoring at one end when the drum is turning in one direction and anchoring at the other end when the drum is turning in the other direction and means for holding at least a portion of the device in any position to which it may be shifted by the wiping action of the drum when the brake is released.

4. A brake comprising a drum, a friction device including a plurality of floating shoes and means for holding the device in any position relatively to the drum to which they may be shifted by the wiping action of the drum when the brake is released.

5. A brake comprising a drum, a friction device engageable with the drum and including at least two shoes adapted to anchor on one of the shoes when the drum is turning in one direction and on the other of the shoes when the drum is turning in the other direction and means for holding at least one of the shoes in any position to which it may be shifted by the wiping action of the drum when the drum is released.

6. A brake comprising a drum, a friction device engageable with the drum including at least two shoes adaptable to anchor on one of the shoes when the drum is turning in one direction and on the other of the shoes when the drum is turning in the other direction and a friction element for holding at least one portion of one of the shoes in any position to which it may be shifted by the wiping action of the drum when the drum is released.

7. A brake comprising, in combination with a drum and applying means, a support, a friction device having a part engaging the support and a tension member connected between the friction device and the support and having sufficient tension to hold the friction device in any position to which it may be shifted with respect to the support except as said tension member is overcome and said device is shifted by the applying means or by the wiping action of the drum.

8. A brake comprising a support, a friction device having a part engaging the support and an opening extending transversely, a tension spring in the opening connected at its ends to the friction device and the support.

9. A brake comprising, in combination with a drum and applying means, a floating friction device and a plurality of friction elements arranged to hold the various parts of the friction device in any position to which it may be shifted by the wiping action of the drum except when overcome by said applying means.

10. A brake comprising, in combination with a drum and applying means, a plurality of floating shoes and a plurality of friction devices arranged to hold the shoes in any position to which they may be shifted by the wiping action of the drum except when overcome by said applying means.

11. A brake comprising, in combination with a drum and applying means, a plurality of floating shoes and a friction element adjacent each end of each shoe and arranged to hold the respective ends of the shoes in any position to which they may be shifted by the wiping action of the drum except when overcome by said applying means.

12. A brake comprising, in combination with a drum and applying means, a plurality of floating shoes and a plurality of friction elements arranged to hold the shoes in any position to which they may be shifted by the wiping action of the drum except when overcome by the applying means, each friction element including a spring serving as a steady rest.

13. A brake comprising, in combination with a drum and applying means, a friction device such as a shoe and a friction element arranged to hold a portion of the friction device in any position to which it may be shifted by the wiping action of the drum except when overcome by the applying means, said element including a spring positioned to take the weight of the friction device.

14. A brake comprising a fixed support, a drum, applying means, a friction element positioned on the support and tension members connecting the opposite ends of the friction element to the support retaining the friction element in frictional engagement with the support and strong enough to prevent said element from shifting with respect to the support except when overcome by the applying means or the wiping action of the drum.

ROY S. SANFORD.